United States Patent [19]

Morozumi et al.

[11] Patent Number: 4,530,970

[45] Date of Patent: Jul. 23, 1985

[54] FLUOROELASTOMER COMPOSITION AND LINING MATERIAL MADE THEREOF

[75] Inventors: Mitsuharu Morozumi; Yasumichi Ito, both of Yokohama; Takeshi Hiramatsu, Hohfu; Minoru Asai, Yamaguchi, all of Japan

[73] Assignee: Asahi Glass Company Ltd., Tokyo, Japan

[21] Appl. No.: 591,494

[22] Filed: Mar. 20, 1984

[30] Foreign Application Priority Data

Apr. 1, 1983 [JP] Japan ................................. 58-55303

[51] Int. Cl.[3] .................... C08L 15/02; C08L 27/12; C08L 27/16; C08L 27/18
[52] U.S. Cl. ................................... 525/193; 525/199
[58] Field of Search ............................... 525/193, 199

[56] References Cited

U.S. PATENT DOCUMENTS

| 3,253,057 | 5/1966 | Landler et al. | 525/193 |
| 3,560,595 | 2/1971 | Phillips et al. | 525/193 |
| 3,769,371 | 10/1973 | Nersasian | 525/199 |
| 4,094,949 | 6/1978 | Yokokawa et al. | 525/199 |

Primary Examiner—Allan M. Lieberman
Attorney, Agent, or Firm—Oblon, Fisher, Spivak, McClelland & Maier

[57] ABSTRACT

A fluoroelastomer composition comprising a fluoroelastomer and a polyvinylidene fluoride, wherein the fluoroelastomer is a peroxide-curable fluorinated copolymer elastomer, the polyvinylidene fluoride is fine powder having an average particle size of at most 20 μm, and the composition contains a peroxide and an allyl compound as essential ingredients.

4 Claims, No Drawings

FLUOROELASTOMER COMPOSITION AND LINING MATERIAL MADE THEREOF

BACKGROUND OF THE INVENTION

1. Field of the Invention

The present invention relates to a fluoroelastomer composition and a lining material made of the composition.

2. Description of the Prior Art

For the protection of an instrument from corrosion by a corrosive fluid, a rubber lining technique is known as well as a technique of lining the substrate surface with plastics, ceramics or noble metals. It is also well known that the rubber lining is superior to other linings in the impact resistance, the abrasion resistance and the processability.

On the other hand, the fluoroelastomer is expected to be a prospective lining material in view of its excellent chemical resistance and heat resistance. However, it has a serious difficulty in the processability when it is processed in the same manner as the processing of a usual rubber lining, and if the molecular weight is lowered to improve the processability, cracks are likely to form during its curing, and thus it is not qualified as a lining material. Because of this difficulty, the fluoroelastomer lining has not yet been practically used for the lining of e.g. a large scale tank.

SUMMARY OF THE INVENTION

Under the above-mentioned circumstances, the present inventors have conducted extensive researches and have found that by using a lining material made of a composition prepared by incorporating a specific polyvinylidene fluoride, a peroxide and an allyl compound as essential ingredients into a peroxide-curable fluorinated copolymer elastomer as the fluoroelastomer, it is possible not only to overcome the above-mentioned difficulty and obtain superior processability which permits the application of the same technique as the usual rubber lining, but also to accomplish a lining which is durable under high temperature or oxidative conditions under which the conventional rubber lining is not durable and obtain a vulcanizate which is superior in the chemical resistance and the mechanical strength to the vulcanizate obtainable from a composition containing no polyvinylidene fluoride. The present invention has been accomplished based on these discoveries.

Namely, the present invention provides a fluoroelastomer composition comprising a fluoroelastomer and a polyvinylidene fluoride, wherein the fluoroelastomer is a peroxide-curable fluorinated copolymer elastomer, the polyvinylidene fluoride is fine powder having an average particle size of at most 20 $\mu$m, and the composition contains a peroxide and an allyl compound as essential ingredients.

Further, the present invention provides a lining material obtained by sheeting such a composition.

DETAILED DESCRIPTION OF THE INVENTION

In the present invention, it is important that the fluoroelastomer to be used is a peroxide-curable fluorinated copolymer elastomer. If the fluoroelastomer is of a diamine-curable type or dihydroxy-curable type, the chemical resistance of the cured lining layer will be poor, or no improvement of the mechanical strength of the cured lining layer will be obtained even if combined with the polyvinylidene fluoride.

Further, fluoroelastomers of such type as a polyfluoroalkyl acrylate elastomer, a polyfluoroalkyl siloxane elastomer and a perfluoroalkylene triazine elastomer, have a difficulty in at least one of the chemical resistance, the heat resistance and the processability and thus they are not suitable as starting materials for lining materials.

The peroxide-curable fluorinated copolymer elastmer to be used in the present invention, preferably has, in its molecular structure, at least one kind of cure site selected from the group consisting of an unsaturated bond, a —$CF_2X$ group where X is iodine or bromine, a >CFX group where X is as defined above and a —$CH_3$ group. As typical examples, there may be mentioned a tetrafluoro ethylene-propylene copolymer, a vinylidene fluoride-hexafluoropropene copolymer, a vinylidene fluoride-chlorotrifluoroethylene copolymer, a vinylidene fluoridepentafluoropropene copolymer, a tetrafluorethylenevinylidene fluoride-propylene copolymer, a tetrafluoroethylene-ethylene isobutylene copolymer, an ethylenehexafluoropropene copolymer, a tetrafluoroethylenebutene-1 copolymer, a tetrafluoroethylene-ethyl vinyl ether copolymer and a tetrafluoroethylene-fluorovinyl ether copolymer. It is particularly preferred to employ a tetrafluoroethylene-propylene copolymer in view of its properties suitable as a lining material, such as the processability and chemical resistance.

The above-mentioned fluoroelastomer preferably has a Mooney viscosity value ($ML_{1+10}$:100° C.) of from 5 to 120, more preferably from 10 to 60. If the viscosity is outside the above range, the following difficulties may arise depending upon the processing conditions. Namely, if the viscosity is too low, it is possible that foaming takes place during the curing operation. On the other hand, if the viscosity is too high, the plasticity of the compound rubber sheet tends to decrease. Thus, processability is likely to be impaired.

In the present invention, various types of polyvinylidene fluoride may be used so long as they are fine powder having an average particle size of at most 20 $\mu$m, preferably at most 10 $\mu$m. Namely, they may be used regardless of the polymerization system by which they are prepared, such as an emulsion polymerization, a suspension polymerization, a solution polymerization or a bulk polymerization, their crystalinity attributable to the proportions of different bonds (such as a head-head bond, a tale-tale bond, a branch, etc.) present in their molecules, or the kinds or amounts of other comonomer units incorporated in an amount of at most 10 mol % as a modifier. However, from the viewpoint of reinforcing effect, it is preferred to use a poly-vinylidene fluoride having a number average molecular weight of at least 100,000. If the average particle size is too large, not only the reinforcing effect will be inadequate, but also the surface smoothness of the lining layer will be impaired and defects such as pinholes are likely to form. If the amount of the polyvinylidene fluoride is too small, no adequate reinforcing effect and no adequate effect for the improvement of the processability will be obtained. On the other hand, if the amount is too large, the plasticity of the compound rubber will be lowered and the sheeting by means of a sheeting mill will be difficult, or even if a sheet is prepared by means of e.g. a press machine, it will be hardly useful as a lining material since it is likely to break at a portion subjected to bending, such as at a corner portion or at an overlapping portion, thus leading to difficulties in the processing, and at the same time the flexibility of the vulcanizate tends to decrease whereby various desirable characteristics attributable to the flexibility of a rubber lining will be lost. Accordingly, it is preferred to use the polyvinylidene fluoride in an amount within a range of from 30 to 300 parts by weight, more preferably from 50 to 200 parts by weight per 100 parts by weight of the fluoroelastomer.

In the present invention, as the peroxide, it is preferred to use an organic peroxide, for instance, a diacyl peroxide such as dibenzoyl peroxide; a monoperoxy compound, e.g. a peroxy ester such as dicumyl peroxide, di-t-butyl peroxide, t-butylcumyl peroxide, t-butylperoxy acetate, t-butylperoxyisopropyl carbonate or t-butylperoxy benzoate; or a diperoxy compound such as 2,5-dimethyl-2,5-di(t-butylperoxy)-hexine-3, 2,5-dimethyl-2,5-(t-butylperoxy)-hexane, $\alpha, \alpha'$-bis(t-butylperoxy)-paradiisopropylbenzene or 2,5-dimethyl-2,5-dimethyl-2,5-di(benzoylperoxy)-hexane. These peroxides may be used alone or in combination as a mixture of two or more. If the amount of the peroxide is too small, the curing tends to be inadequate and the durability of the lining layer will be inadequate. On the other hand, if the amount is too large, there will be a drawback such as foaming. Accordingly, it is preferred to use the peroxide in an amount within a range of from 0.1 to 10 parts by weight, more preferably from 0.5 to 8 parts by weight per 100 parts by weight of the fluoroelastomer.

In the present invention, it is important to use an allyl compound in addition to the above-mentioned peroxide to obtain an adequate curing density and adequate durability of the lining layer. As such an allyl compound, there may be mentioned, for instance, triallyl isocyanate, triallyl cyanurate, triallyl phosphate, diallyl phthalate or diallyl melamine. If the amount of the allyl compound is too small, the curing will be inadequate. On the other hand, if the amount is too large, the allyl compound is likely to bleed out and contaminate the fluid which is in contact therewith. Accordingly, it is preferred to use the allyl compound in an amount within a range of from 0.2 to 20 parts by weight, more preferably from 1 to 10 parts by weight, per 100 parts by weight of the fluoroelastomer.

In the present invention, in addition to the above-mentioned ingredients, there may be optionally incorporated a filler such as carbon black or fine silica, a mold releasing ingredients such as sodium stearate, and various other additives such as a pigment, an antioxidant and a stabilizer, to reduce the shrinkage or the coefficient of thermal expansion, to improve the coefficient of thermal conductivity or the processability or to provide an identification. In the selection of such additives, it is of course important to take into consideration e.g. the acid resistance, water resistance, oxidation resistance or the bleeding property, depending upon the particular purpose of the composition.

In the present invention, it is desirable to adequately uniformly mix the ingredients of the composition and the above-mentioned various additives which may be optionally added. Such mixing is usually conducted by means of a conventional mixing mill or Bumbury's mixer. There is no particular restriction as to the conditions for the mixing. However, it is desirable to conduct the mixing at a temperature within a range where no decomposition of the peroxide or no melting of the fine powder of the polyvinylidene fluoride proceeds. The mixing temperature is usually selected within a range of from 30° to 80° C. A mixing time of from 10 to 60 minutes is usually sufficient.

The uncured compound rubber obtained by the above mixing, is highly plastic and can readily be formed into a sheet having a predetermined thickness by means of e.g. extrusion, sheeting or calendering. By such a method, the lining material of the present invention can be produced.

There is no particular restriction for the method of lining with the lining material of the present invention. By virtue of the plasticity, it is possible to apply the same lining method as used for the conventional rubber lining. For instance, in the case of inner lining of e.g. a tank, the lining material is applied on the substrate subjected to proper under treatment, by means of a hand roller or stitcher. For the application to an overlapping portion, a suitable solvent or coadhesive is coated on the portion and then the lining material is applied. For the application to a curved portion or a corner portion, the lining material is applied while bending it to conform with the curved or corner portion. Thus, it is possible to readily attach the lining material over the entire surface in a uniform thickness. The thickness of the lining material is usually selected within a range of from 1 to 6 mm.

For the curing of the composition of the present invention, it is possible to employ various curing methods by means of various curing machines such as a commonly employed curing press, steam oven or curing oven. The curing method is optionally selected depending upon the particular purpose. The curing is usually conducted at a temperature of from 60° to 300° C. However, in order to secure an adequate reinforcing effect derived from addition of the polyvinylidene fluoride, it is preferred to employ a curing temperature of not lower than the melting point of the polyvinylidene fluoride. However, in some cases, the curing at a temperature lower than the melting point is sufficient.

The lining material of the present invention is superior in the processability and is capable of providing a reliable lining for a large scale instrument or a complex shape article, and at the same time, it is applicable to the uses where chemical resistance, heat resistance and flexibility are required. Thus, the lining material of the present invention has an extremely high industrial value.

Now, the present invention will be described in further detail with reference to Examples. However, it should be understood that the present invention is by no means restricted by these specific Examples.

EXAMPLES

Examples 1 to 8 and Comparative Examples 1 to 2

Mixtures having various formulations as shown in Table 1 (by parts by weight) were prepared by using (A) a tetrafluoroethylene-propylene copolymer having a Mooney viscosity of about 30 (Aflas ®150L manufactured by Asahi Glass Company Ltd.), as the fluoroelastomer; (B) fine powder of polyvinylidene fluoride having an average particle size of about 10 μm (Kynar ®#461 manufactured by Pennwalt Co., United States) as the polyvinylidene fluoride; (C) $\alpha,\alpha'$-bis-(t-butylperoxy)-para-diisopropyl benzene (Peroxymon ®F-100 manufactured by Nippon Oil and Fats Co., Ltd.), as the peroxide; (D) triallyl isocyanurate as the allyl compound; and (E) MT carbon black (Thermax MT ® manufactured by R. T. Vanderbilt Co. Inc., United States), as a filler. The mixtures were respectively kneaded for 30 minutes by a rubber mixing mill maintained at a temperature of 50° C. to obtain various compound rubbers.

further added to the mixture of Example 10. The physical properties of the vulcanizates thereby obtained are shown in Table 4. In each case, the reinforcing effect attributable to the polyvinylidene fluoride was observed.

TABLE 1

| Ingre- | Examples | | | | | | | | Comparative Examples | |
|---|---|---|---|---|---|---|---|---|---|---|
| dients | 1 | 2 | 3 | 4 | 5 | 6 | 7 | 8 | 1 | 2 |
| A | 100 | 100 | 100 | 100 | 100 | 100 | 100 | 100 | 100 | 100 |
| B | 50 | 100 | 150 | 200 | 50 | 100 | 150 | 200 | 0 | 0 |
| C | 1.5 | 1.5 | 1.5 | 1.5 | 1.5 | 1.5 | 1.5 | 1.5 | 1.5 | 1.5 |
| D | 7 | 7 | 7 | 7 | 7 | 7 | 7 | 7 | 7 | 7 |
| E | 40 | 40 | 40 | 40 | 0 | 0 | 0 | 0 | 40 | 0 |

Each compound rubber thus obtained was sheeted to obtain a sheet having a thickness of 1 mm, which was subjected to pressurized steam cure for 2 hours in a steam oven by means of steam under a pressure of 4 kg/cm$^2$. The physical properties of the vulcanizate thereby obtained, as measured in accordance with JIS K6301, are shown in Table 2, and similar physical properties in a case where the curing condition was changed to pressure of 6 kg/cm$^2$ and curing time of 2 hours, are shown in Table 3. In these Tables, Tb indicates tensile strength (unit: kg/cm$^2$), Eb indicates elongation (unit: %), Hs indicates JIS A hardness and Tr indicates tear strength (unit: kg/cm).

It is evident from these Tables that remarkable reinforcing effectiveness is obtained by the addition of a certain amount of the fine powder of polyvinylidene fluoride.

TABLE 4

| Examples | 9 | 10 | 11 |
|---|---|---|---|
| Tb | 104 | 146 | 150 |
| Eb | 260 | 220 | 170 |
| Hs | 94 | 90 | 92 |

Examples 12 to 14

To 100 parts by weight of (A) the same fluoroelastomer as used in Example 1, (B) the same polyvinylidene fluoride as used in Example 1 was added in various amounts as shown in Table 5, and 5 parts by weight of (H) t-butylperoxy benzoate (Perbutyl ®Z manufactured by Nippon Oil & Fats Co., Ltd.) as the peroxide, 5 parts by weight of (D) as the allyl compound, 40 parts by weight of (E) as a filler and 2 parts by weight of (I)

TABLE 2

| Ingre- | Examples | | | | | | | | Comparative Examples | |
|---|---|---|---|---|---|---|---|---|---|---|
| dients | 1 | 2 | 3 | 4 | 5 | 6 | 7 | 8 | 1 | 2 |
| Tb | 101 | 133 | 143 | 153 | 103 | 115 | 161 | 156 | 56 | 52 |
| Eb | 180 | 120 | 40 | 40 | 240 | 120 | 100 | 40 | 380 | 500 |
| Hs | 95 | 98 | 97 | 98 | 88 | 95 | 97 | 98 | 80 | 58 |
| Tr | 28 | 34 | 37 | 27 | 33 | 33 | 39 | 30 | 23 | 20 |

TABLE 3

| Ingre- | Examples | | | | | | | | Comparative Examples | |
|---|---|---|---|---|---|---|---|---|---|---|
| dients | 1 | 2 | 3 | 4 | 5 | 6 | 7 | 8 | 1 | 2 |
| Tb | 135 | 157 | 181 | 165 | 151 | 172 | 184 | 187 | 54 | 53 |
| Eb | 170 | 130 | 130 | 120 | 270 | 200 | 170 | 150 | 350 | 470 |
| Hs | 95 | 99 | 97 | 98 | 92 | 97 | 98 | 98 | 80 | 58 |
| Tr | 39 | 46 | 56 | 61 | 49 | 67 | 55 | 63 | 32 | 20 |

Examples 9 to 11

Compound rubbers were prepared to have the same formulation as in Example 5 except that the kind and the amount of the peroxide were changed. The compound rubbers were cured for 4 hours by means of steam under pressure of 4 kg/cm$^2$, and the physical properties of the cured materials were measured.

Namely, the curing test was conducted with respect to a mixture (Example 9) wherein 1.5 parts by weight of (F) 2,5-dimethyl-2,5-(t-butylperoxy)-hexane (Perhexa 25B manufactured by Nippon Oil & Fats Co., Ltd.) was used as the peroxide; a mixture (Example 10) wherein 6 parts by weight of (G) t-butylcumyl peroxide (Perbutyl C manufactured by Nippon Oil & Fats Co., Ltd.) was used as the peroxide; and a mixture (Example 11) wherein 40 parts by weight of (E) MT Carbon was sodium stearate as a mold releasing agent, were further added. The mixtures thus obtained were respectively kneaded for 30 minutes by a rubber mixing mill maintained at a temperature of 50° C. to obtain various compound rubbers. Each compound rubber was sheeted to obtain a sheet having a thickness of 1 mm, which was subjected to pressurized steam cure for 2 hours by means of steam under pressure of 4 kg/cm$^2$. The physical properties of the vulcanizates thereby obtained are shown in Table 5.

TABLE 5

| Examples | 12 | 13 | 14 |
|---|---|---|---|
| Amount of B | 100 | 150 | 200 |
| Tb | 110 | 155 | 202 |
| Eb | 180 | 100 | 90 |

TABLE 5-continued

| Examples | 12 | 13 | 14 |
| --- | --- | --- | --- |
| Hs | 90 | 98 | 98 |

Examples 15 to 18

Various compound rubbers were prepared to have the same formulation as in Example 6 except that the following various copolymers were used instead of the fluoroelastomer (A).

(J) Vinylidene fluoride-hexafluoropropene-tetrafluoroethylene copolymer (Mooney viscosity: about 100, cure site presumably —$CF_2I$) (Daiel ®G-901 manufactured by Daikin Industries, Ltd.)

(K) Vinylidene fluoride-hexafluoropropene copolymer (Mooney viscosity: about 75, cure site: presumably —$CF_2I$) (Daiel ®G-801 manufactured by Daikin Industries, Ltd.)

(L) Vinylidene fluoride-hexafluoropropene copolymer (Mooney viscosity: about 110, cure site: presumably >CFBr) (Viton ®GF manufactured by DuPont Co., United States)

(M) Tetrafluoroethylene-propylene copolymer (Mooney viscosity: about 60, cure site: presumably —$CH_3$ and/or an unsaturated bond) (Aflas 150 E manufactured by Asahi Glass Company Ltd.)

Each compound rubber thus obtained was sheeted to obtain a sheet having a thickness of 1 mm, which was subjected to press curing at 180° C. for 1 hour. The physical properties of the vulcanizate thereby obtained are shown in Table 6.

In Example 17, 4 parts by weight of magnesium oxide was incorporated in addition to the above formulation.

TABLE 6

| Examples | 6 | 15 | 16 | 17 | 18 |
| --- | --- | --- | --- | --- | --- |
| Fluoroelastomers | A | J | K | L | M |
| Tb | 181 | 203 | 193 | 187 | 185 |
| Eb | 170 | 150 | 180 | 200 | 160 |
| Hs | 97 | 98 | 98 | 97 | 98 |
| Tr | 65 | 71 | 61 | 68 | 57 |

Comparative Examples 3 and 4

Mixtures were prepared to have the formulations shown in Table 7 (by parts by weight) by using (N) a polyol-curable elastomer (vinylidene fluoride-hexafluoropropene copolymer containing hydroquinone as curing agent: Fluorel ®#2176 manufactured by 3M, United States) as the fluoroelastomer. The mixture were respectively kneaded for 30 minutes by rubber mixing rolls maintained at a temperature of 50° C.

TABLE 7

| Comparative Examples | 3 | 4 |
| --- | --- | --- |
| Fluoroelastomer (N) | 100 | 100 |
| Polyvinylidene fluoride (B) | 100 | 200 |
| Magnesium oxide MgO | 3 | 3 |
| Calcium hydroxide Ca(OH)$_2$ | 6 | 6 |
| MT Carbon | 10 | 10 |

In the case of the mixture of Comparative Example 4, the sheet became extremely brittle during the curing operation. In the case of the mixture of Comparative Example 3, Tb, Eb, Hs and Tr were as low as 120, 70, 92 and 24, respectively, even after it was cured by pressurized steam cure for 1 hour under pressure of 5 kg/cm$^2$. In each case, no effect by the addition of the polyvinylidene fluoride was observed.

Comparative Example 5

A compound rubber was prepared to have the same formulation as in Example 2 except that a polyvinylidene fluoride having an average particle size of about 300 μm (KF Polymer ®#1000 manufactured by Kureha Chemical Industry Co., Ltd.) was used instead of the polyvinylidene fluoride (B). In this case, the surface smoothness of the sheet made of the compound rubber, was poor. Further, Tb, Eb, Hs and Tr were as low as 95, 50, 94 and 26, respectively, even after it was cured by press curing at 160° C. for 1 hour.

Examples 19 to 20

Application for lining a tank

A lining material obtained by sheeting the compound rubber of Example 2 to a thickness of 5 mm, was lined on the inner surface of a box-shaped tank (width: 2.3 m, length: 4.5 m and depth: 2.0 m made of steel) (SS-41), in the following manner (Example 19).

Firstly, the inner surface of the substrate was sand blasted and coated with an organic silicone primer (Metaloc ®S-10 manufactured by Toyo Kagaku Kenkyusho Co., Ltd.). Then, a coadhesive prepared by dissolving the compound rubber of Example 2 in tetrahydrofuran, was coated and dried. On the other hand, the same coadhesive was applied to the surface of the above-mentioned lining material to impart adhesiveness, and the lining material was applied and lined on the substrate by means of a hand roller. The lined tank was placed in a steam oven and subjected to pressurized steam cure for 1 hour by means of steam under pressure of 7 kg/cm$^2$.

The lining thereby obtained was free from defects such as blisters or pin holes, and its adhesion to the substrate was strong and firm.

In Example 20, the lining operation was conducted in the same manner as above except that the compound rubber of Example 8 was used as the compound rubber. In this case, good lining was obtained as in the above case.

Examples 21 and 22

Application to the lining of the inner surface of a rubber expansion joint

A rubber expansion joint (inner diameter: 300 mm, length: 200 mm) having a fluoroelastomer layer on its inner surface, was prepared by using the compound rubber of Example 2, in the following manner (Example 21).

The above-mentioned uncured compound rubber sheet was put around a steel pipe having an outer diameter of 300 mm in a thickness of 5 mm. Then, after coating the same primer as used in Example 19, a polyester cloth was put around it, and an epoxy modified phenolic adhesive (Metaloc ®G manufactured by Toyo Kagaku Kenkyusho Co., Ltd.) was coated and dried. Then, an uncured compound rubber sheet made of chloroprene-type synthethic rubber (Neoprene ® manufactured by Showa Neoprene K.K.) was put around thereon in a thickness of 5 mm, and then a rubber expansion molding operation was conducted in the usual manner. Then, pressurized steam curing was conducted in a steam oven for 1 hour by means of steam under pressure of 6 kg/cm² to obtain a unitary expansion joint having no seams on the internal surface. The expansion joint thus obtained, was superior in the chemical resistance and did not undergo any substantial change even when contacted with a solution containing 150 g/liter of nitric acid and 50 g/liter hydrofluoric acid at a temperature of 60° C. for 6 months.

An expansion joint was prepared in the same manner as above except that a compound rubber having the same formulation as in Example 15 was used as the compound rubber (Example 22). In this case, an expansion joint having superior chemical resistance as above, was obtained.

What is claimed is:

1. A fluoroelastomer composition comprising a fluoroelastomer and a polyvinylidene fluoride, wherein
   (a) the fluoroelastomer is a peroxide-curable fluorinated copolymer elastomer,
   (b) the polyvinylidene fluoride is a fine powder having an average particle size of at most 20 μm, and the composition contains a peroxide and about 0.2 to 20 polyallyl monomer as essential ingredients; wherein the amounts of the polyvinylidene fluoride, the peroxide and the allyl compound are from 30 to 300 parts by weight, from 0.1 to 10 parts by weight and from 0.2 to 20 parts by weight, respectively, based on 100 parts by weight of the fluoroelastomer; wherein the fluorinated copolymer elastomer has, in its polymer structure, at least one kind of cure site selected from the group consisting of an unsaturated bond, a —CF$_2$X group where X is iodine or bromine, a CFX group where X is as defined above and a —CH$_3$ group.

2. The composition according to claim 1, wherein the fluorinated copolymer elastomer contains units derived from tetrafluoroethylene and propylene, as essential components.

3. A lining material obtained by sheeting the composition as defined in claim 1.

4. The lining material according to claim 3, wherein the fluorinated copolymer elastomer has a Mooney viscosity (ML$_{1+10}$:100° C.) of from 5 to 120.

* * * * *